July 31, 1928.
H. T. THOMAS
1,678,657
SIDE GUARD FOR MOTOR VEHICLES
Filed May 19, 1924　　2 Sheets-Sheet 1
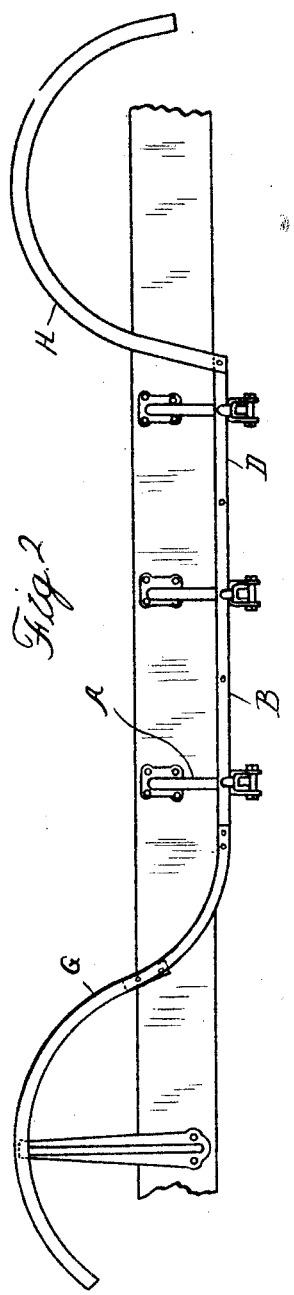
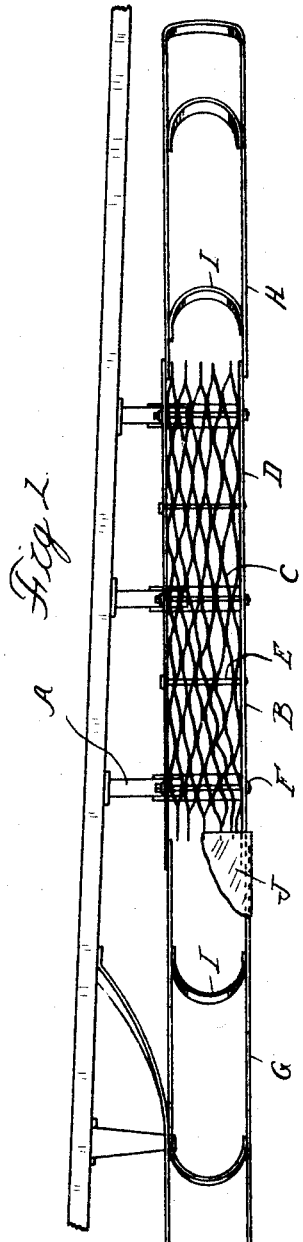
Inventor
Horace T. Thomas July 31, 1928.
H. T. THOMAS
1,678,657
SIDE GUARD FOR MOTOR VEHICLES
Filed May 19, 1924 2 Sheets-Sheet 2
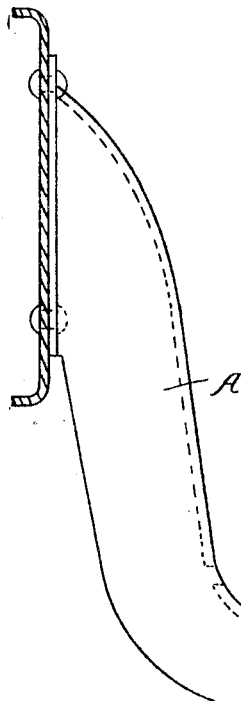
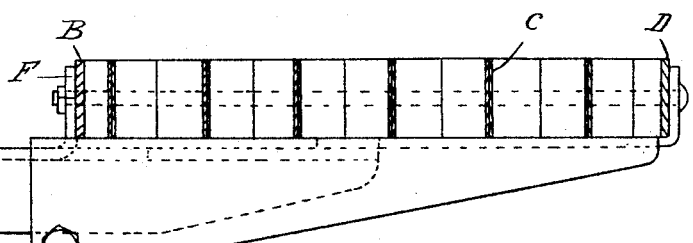
Fig. 3.
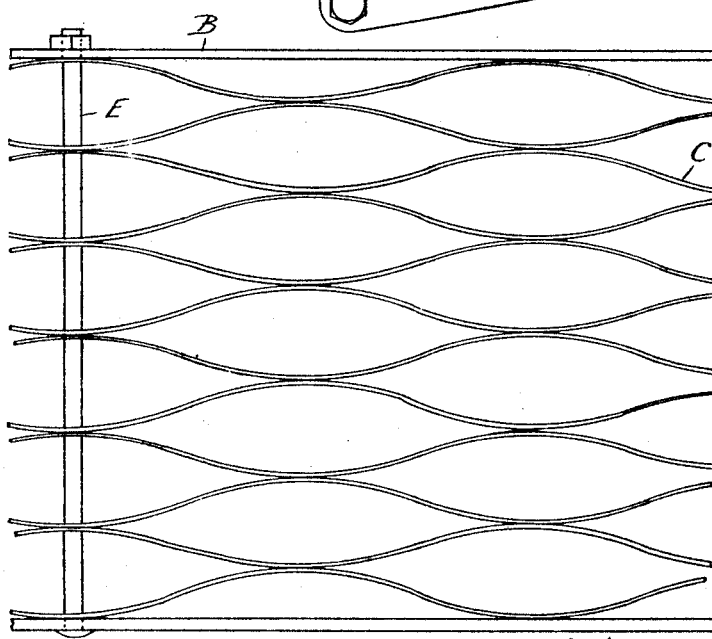
Fig. 4.
Inventor
Horace T. Thomas Patented July 31, 1928.

1,678,657

UNITED STATES PATENT OFFICE.

HORACE T. THOMAS, OF LANSING, MICHIGAN.

SIDE GUARD FOR MOTOR VEHICLES.

Application filed May 19, 1924. Serial No. 714,507.

The invention relates to motor vehicles and more particularly to passenger carrying vehicles. It is the primary object of the invention to afford greater protection to the vehicle against side collisions. It is a further object to obtain this protection through parts of the vehicle normally performing independent functions, such for instance as the running board and the wheel fenders. Still further, it is an object to obtain a construction having various advantages as hereinafter set forth.

In the drawings:

Figure 1 is a plan view of a portion of a vehicle body showing my improvement applied thereto;

Figure 2 is a side elevation thereof;

Figure 3 is a transverse section showing the running board and supporting bracket;

Figure 4 is a plan view of a portion of the running board.

In the present state of the art it is usual to provide motor vehicles with resilient bumpers in front and rear, which afford considerable protection. At the sides the body is slightly protected by the running board and wheel fenders, but these parts are without resiliency and are insufficient in strength to withstand any considerable shock. My improvement is designed to afford greater side protection, particularly for taxicabs and other commercially operated passenger carrying vehicles, and to accomplish this result without increase in the overall width of the car. This is preferably effected by an improved construction in both the running board and the fenders, but either one of these alone will afford increased protection.

As shown in Figures 1 and 2, A are the running board supporting brackets and B the running board mounted thereon. This running board is formed of a resilient yieldable construction, preferably by the arrangement side-by-side of a plurality of longitudinally waved resilient bars C. These bars may be enclosed in an outer frame D of heavier resilient metal and the whole structure is secured together by rods or bolts E at suitable spaced intervals. Certain of these bolts may also be used for attaching the running board to the brackets A, which latter as shown are provided with upturned ears F apertured for the passage of the bolt. The fenders G and H arranged respectively at the forward and rear end of the running board are preferably formed by resilient frames with a cover of light gauge metal, or other sheet material. As shown, each frame is formed by a looped bar which is return bent at its outer end and has suitably fashioned front and rear portions extending to the running board. It is also provided at intermediate points with the looped cross members I, which form a yieldable reinforcement therefor. The covering material J may either be thin gauge metal or some flexible non-metallic material, such as molded rubber.

With the construction as described, in use the running board and fenders perform their usual functions and in addition thereto form a buffer for protecting the vehicle body from side shocks. Thus in case of a side collision, striking either the running board or one of the fenders, the structure will yield, and at the same time oppose sufficient resistance to absorb a considerable portion of the shock. In case the blow is upon the running board, the waved ribbon bars will collapse and upon release of pressure will be restored to their original form without injury. If the blow is against one of the fenders, this may destroy the cover, but will not injure the frame. If the cover is formed of sheet metal, it may be easily replaced at small expense, or in case it is made of a flexible material, such as molded rubber, it may escape injury.

In addition to the protective feature of my improved construction, it has the further advantage of contributing to the appearance of the car. It is a very common thing especially with commercial vehicles to have damaged fenders and while these may be straightened out so as to properly function, the finished appearance of the car is destroyed. With my improvement renewals can be quickly made at small expense, so that the finish of the car is maintained.

There is also an advantage in forming the running board of an open grid rather than an imperforate platform, as this permits mud and dirt to drop through.

What I claim as my invention is:

1. In a motor vehicle, a resiliently yieldable member, including a plurality of resilient curved bars, constituting a combined running board and bumper.

2. In a motor vehicle, a running board formed of a laterally resilient yieldable grid, the said grid being formed of resilient bars whereby the resiliency of the said bars tends to expand the said grid laterally.

3. In a motor vehicle, a running board comprising a plurality of adjacent waved resilient bars forming a yieldable grid.

4. In a motor vehicle, a running board comprising a border frame and a plurality of waved resilient bars interposed between the sides of said frame forming a yieldable grid.

5. In a motor vehicle, a running board comprising inner and outer longitudinal frame bars, and a plurality of waved resilient bars interposed therebetween and together constituting a yieldable grid.

6. In a motor vehicle, a running board comprising supporting brackets, inner and outer frame bars, a plurality of intermediate resilient waved bars, securing means for said bars to said brackets permitting the lateral yielding of the same.

7. In a motor vehicle, a running board comprising outer and inner longitudinal bars, a plurality of waved resilient bars intermediate the same, bolts passing through aligned apertures in said bars to secure the same together and to form an open grid, and brackets for supporting said grid permitting the lateral yielding of the same.

8. In a motor vehicle, the combination with a resilient grid running board, of a fender secured thereto comprising a resilient yieldable frame and a cover.

9. In a motor vehicle, the combination with a resilient grid forming a running board, of a fender comprising a looped resilient frame having its ends secured to said running board, and a cover of thin sheet material for said frame.

10. In a motor vehicle, a running board comprising a plurality of resilient bars, contacting with each other at spaced points and forming a yieldable grid.

11. In a motor vehicle, a laterally yieldable running board including a plurality of longitudinally extending resilient bars, each bar being curved to alternately abut the next adjacent bar on each side.

In testimony whereof I affix my signature.

HORACE T. THOMAS.